United States Patent [19]

Pierce et al.

[11] Patent Number: 5,718,055
[45] Date of Patent: Feb. 17, 1998

[54] INTERLOCK GAUGE

[75] Inventors: Scott C. Pierce, Cheshire, Conn.; Charles LeBon, Bloomington, Ind.

[73] Assignee: Otis Elevator Company, Farmington, Conn.

[21] Appl. No.: 576,929

[22] Filed: Dec. 22, 1995

[51] Int. Cl.$^6$ .................................................. G01B 3/30
[52] U.S. Cl. ........................... 33/501.05; 33/501.45; 33/645
[58] Field of Search ........................... 33/501.05, 429, 33/451, 474, 479, 501, 501.06, 501.08, 501.09, 501.45, 613, 533, 626, 645, 655, 545, 567

[56] References Cited

U.S. PATENT DOCUMENTS

| 2,026,274 | 12/1935 | Doyle | 33/429 |
| 3,419,966 | 1/1969 | Rowe, Jr. | 33/501.05 |
| 4,090,302 | 5/1978 | Bollmer | 33/567 |
| 4,850,114 | 7/1989 | Vockins | 33/645 |
| 5,253,426 | 10/1993 | Mosbrucker | 33/429 |

FOREIGN PATENT DOCUMENTS

| 650588 | 2/1951 | United Kingdom | 33/501.05 |

*Primary Examiner*—Christopher W. Fulton

[57] ABSTRACT

A gauge for installation and adjustment of an interlock mechanism in elevator systems includes a gauge body with a horizontal line level and a first and a second arms protruding from the gauge body. The first arm is sized to establish a horizontal distance between two rollers of the interlock mechanism in the closed position during the adjustment procedure. The second arm is sized to establish a horizontal distance between two rollers of the interlock mechanism in the open position during the adjustment procedure. The gauge ensures consistently accurate horizontal measurement between the two rollers of the interlock mechanism in both the closed and open positions and proper alignment of the interlock mechanism during the installation and adjustment procedures.

9 Claims, 3 Drawing Sheets

INTERLOCK GAUGE

TECHNICAL FIELD

This invention relates to an elevator system installation and, more particularly, to a gauge for installation and adjustment of an interlock mechanism therefor.

BACKGROUND OF THE INVENTION

A number of service callbacks for newly installed elevator systems can be attributed to improper installation of interlock mechanisms or door locks. The interlock mechanisms are electromechanical devices that maintain the hoistway doors (the exterior entrance doors at every floor) closed during the times that the elevator car doors are not open at that landing. The interlock mechanisms also facilitate simultaneous opening of the elevator car doors and exterior doors when the elevator car reaches its destination floor. The interlock mechanism is disposed on the hoistway side of the exterior doors at every floor.

One of the main reasons for the high rates of service callbacks caused by the interlock mechanisms is the inaccurate adjustment thereof during installation and regular service. The adjustment of the interlock mechanism requires that tight dimensional tolerances be maintained between two rollers of its two subassemblies during the open and closed positions of the interlock mechanism. The exact horizontal distance must be set in each position (open and closed) between the two rollers of each interlock mechanism on every floor of the elevator system. The horizontal distances between the two rollers are difficult to measure because the rollers are offset vertically.

Additionally, it is critical to ensure that the interlock mechanisms on every floor are in register with each other. In the closed position of the interlock mechanism, a door vane disposed on the outside of the elevator car door passes between the two rollers as the elevator car moves by the floor. If the rollers are too close together, the door vane does not have sufficient running clearance and damages the interlock mechanism on impact. If the rollers are spaced too far apart in the lo closed position, another portion of the interlock mechanism will interfere with the door vane. In the open position, the rollers grip the door vane to ensure that the two sets of doors open simultaneously. If the two rollers are too close together during the open position of the interlock mechanism, the door vane does not fit therebetween. If the rollers are spaced too far apart during the open position, the rollers do not have sufficient grip on the door vane and the doors will not close simultaneously.

Thus, it is crucial to maintain the interlock mechanisms on each floor in register with each other so that the running clearance for the door vane is assured and to maintain consistently tight horizontal tolerances between the rollers in open and closed positions so that the doors open simultaneously and that damage to the interlock mechanism is avoided.

DISCLOSURE OF THE INVENTION

It is an object of the present invention to reduce the number of repair callbacks associated with installation and adjustment of an interlock mechanism.

It is another object of the present invention to improve installation and adjustment procedures for interlock mechanism in an elevator system.

It is a further object of the present invention to provide a gauge for installation and adjustment of an interlock mechanism for elevator systems.

According to the present invention, an interlock gauge for the installation and adjustment of interlock mechanisms in an elevator system includes a gauge body having a first horizontal line level mounted therein, a first arm extending from the body, and a second arm extending from the body and being spaced apart from the first arm. The first arm is dimensioned to fit between two rollers of the interlock mechanism when the interlock mechanism is in closed position. The width of the second arm is equal to the horizontal distance between the two rollers when the interlock mechanism is in the open position.

The gauge is used to set the horizontal distance between the vertically offset rollers in both the closed and open positions of the interlock mechanism. The first arm of the gauge is placed between the rollers in the closed position with the first horizontal line level being leveled. The position of the rollers is then adjusted to fit snugly on each side of the first arm. The second arm is subsequently inserted between the rollers in the open position of the interlock mechanism. The rollers are adjusted further to fit snugly against the sides of the second arm of the gauge.

One feature of the present invention is a second horizontal line level disposed within either the first or second arm of the gauge. The gauge is also utilized to ensure that the interlock mechanism is mounted onto the elevator door in a straight position. An open edge of the gauge body is placed against one side of the interlock mechanism. The interlock mechanism is adjusted so that the second horizontal line level is leveled.

The interlock gauge of the present invention allows consistently accurate installation and adjustment of the interlock mechanism. The gauge ensures that the first and second rollers are properly spaced in both open and closed positions despite the vertical offset and ensures consistency among the interlock mechanism on each floor. The gauge also ensures that each interlock mechanism is installed plumb (straight up and down) on every floor. The installation and adjustment procedures are significantly simplified and accuracy is improved when the gauge of the present invention is used. Proper installation and adjustment of the interlock mechanism eliminates many service callbacks resulting from improper operation of the elevator.

One advantage of the present invention is that the gauge eliminates the need for the repair crew to carry and use multiple tools to install and/or adjust the interlock mechanism.

Foregoing and other objects of the present invention become more apparent in light of the following detailed description of the exemplary embodiment thereof, as illustrated in the accompanying drawings.

BEST MODE FOR CARRYING OUT THE INVENTION

Figure 1:
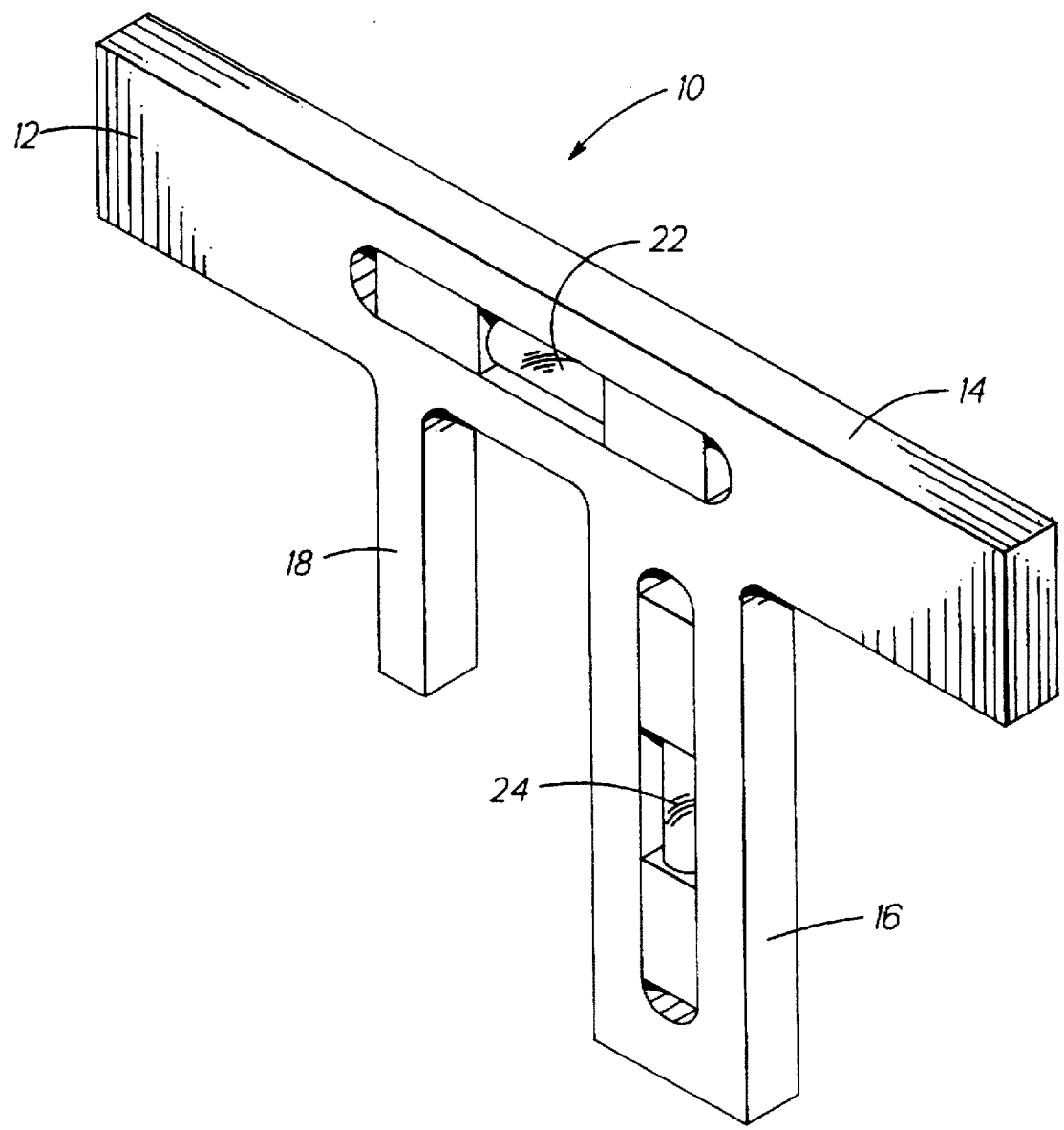
FIG. 1 is a perspective view of an interlock gauge according to the present invention.

Referring to FIG. 1, an interlock gauge 10 includes a gauge body 12 having an open edge 14, a first arm 16 extending from the gauge body 12, and a second arm 18 extending from the gauge body 12 and being spaced apart from the first arm 16. The first and second arms 16, 18 extend from the gauge body at a ninety degree (90°) angle. A first horizontal line level 22 is disposed within the gauge body 12. A second horizontal line level 24 is disposed within the first arm 16.

Figure 2:
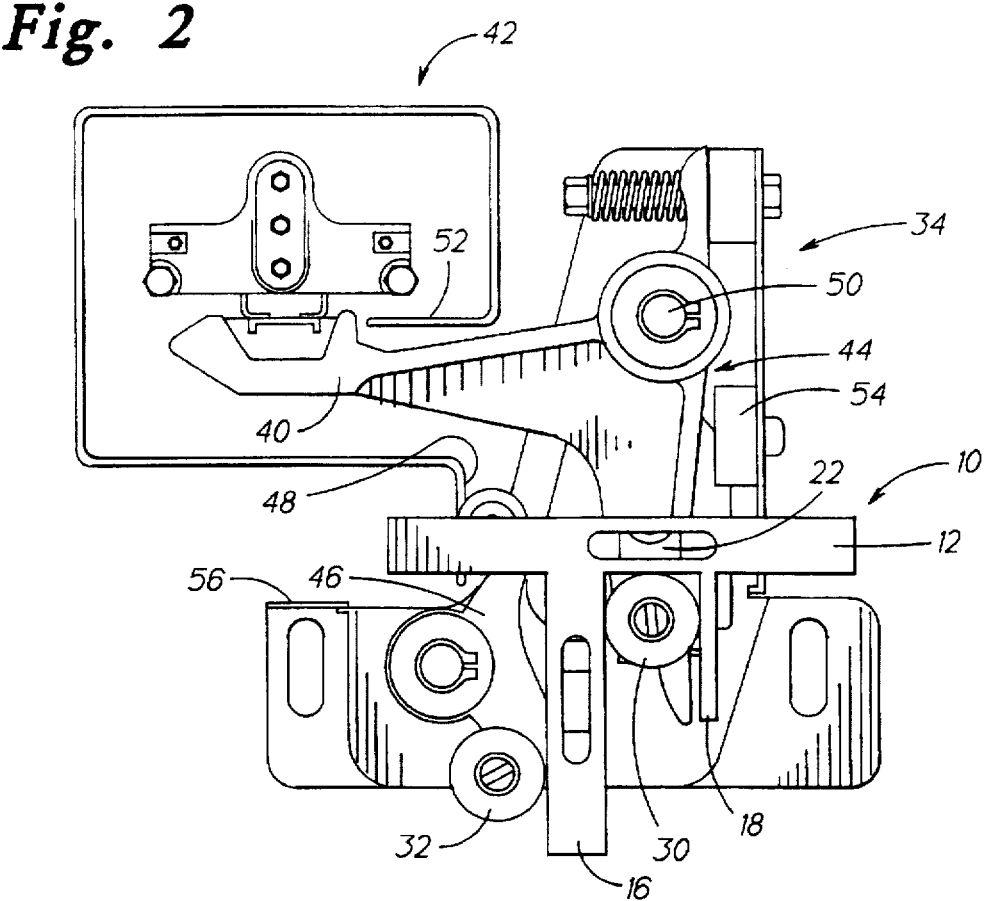
FIG. 2 is a front view of an interlock mechanism in a closed position with the interlock gauge of FIG. 1 setting the horizontal distance between two rollers.

The width of the first arm 16 is equal to the horizontal distance between a first roller 30 and a second roller 32 of an interlock mechanism 34 when the interlock mechanism 34 is in its closed position, as shown in FIG. 2. The width of the second arm 18 is equal to the horizontal distance between the first roller 30 and the second roller 32 when the interlock mechanism 34 is in the open position, as shown in FIG. 3.

Figure 4:
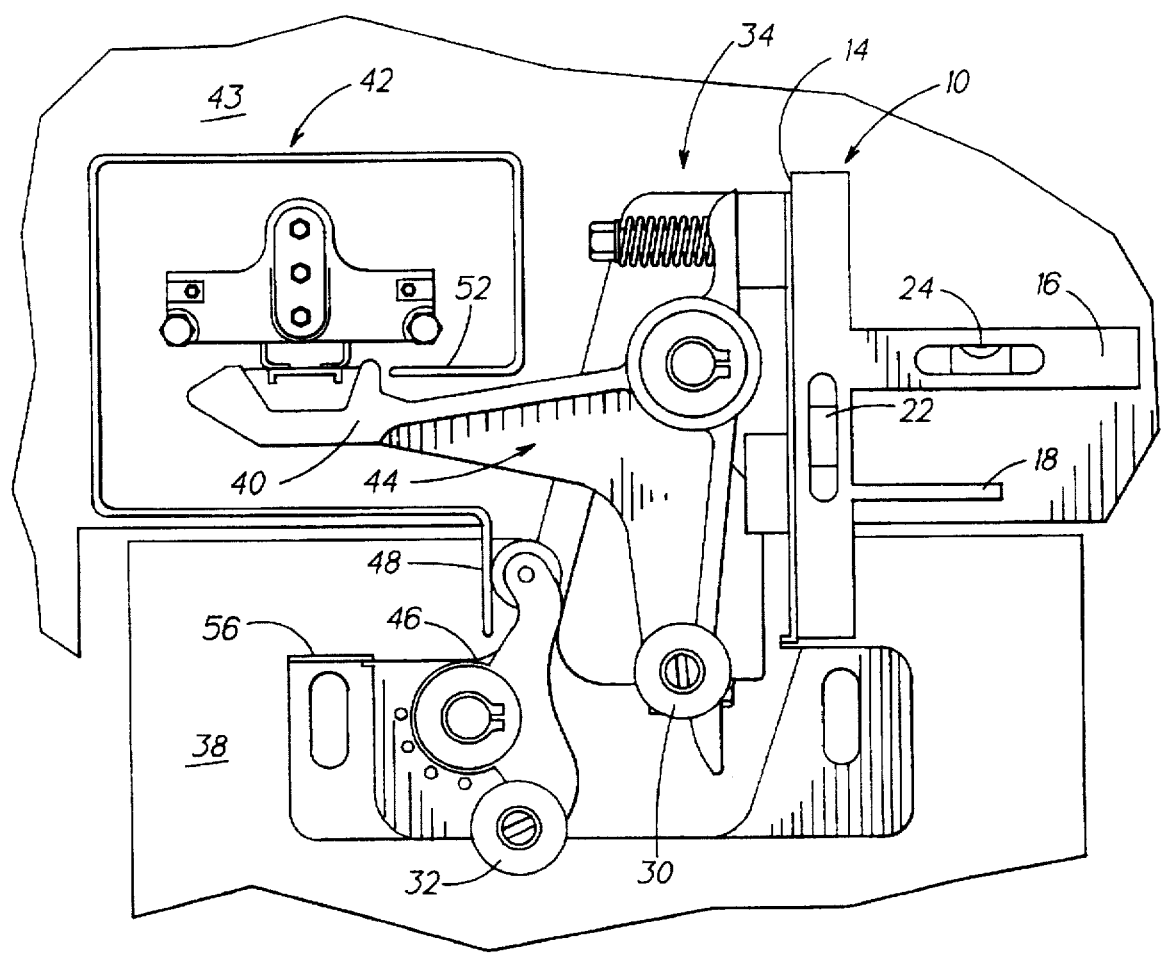
FIG. 4 is a front view of the interlock mechanism with the interlock gauge of FIG. 1 ensuring that the interlock mechanism is straight.

Referring to FIG. 4, during the installation procedure of the interlock mechanism 34 for an elevator system, the gauge 10 is used to ensure that each interlock mechanism assembly 34 is straight up and down (plumb). The open edge 14 of the gauge 10 is placed up against the interlock mechanism 34. The second horizontal line level 24 is used as an indicator of whether the interlock mechanism is plumb. The procedure is repeated for each interlock mechanism located at every floor of the elevator system to ensure that all the interlock mechanisms 34 are in register with each other.

During the adjustment procedure of the interlock mechanism 34, the gauge 10 is used to adjust the position of the rollers 30, 32 with respect to each other. The rollers 30, 32 must be spaced apart at exactly same distance in every interlock mechanism on every floor of the elevator system. Referring to FIG. 2, when the elevator exterior door 38 is closed, the interlock mechanism 34 is in its closed position with a latch 40 making electrical contact with an electric box 42 which is fixedly attached onto a hoistway wall 43. The first roller 30 is part of a latch subassembly 44 and is in its closed position. A bell crank subassembly 46 is in the open position when the interlock mechanism is closed. The bell crank 46 is maintained open by a tab 48 on the electrical box 42. The second roller 32 is part of the bell crank subassembly 46. When the interlock mechanism is in the closed position, the first arm 16 of the gauge 10 is inserted between the first and second rollers 30, 32 with the first horizontal line level 22 being leveled. The width of the first arm 16 of the gauge 10 is the exact horizontal measurement that must be maintained between the rollers 30, 32 when the interlock mechanism is in the closed position. If the rollers 30, 32 are not properly spaced, the position of the second roller 32 is adjusted by adjusting the tab 48 on the electric box 42 to ensure the exact horizontal measurement between the rollers 30, 32.

Figure 3:
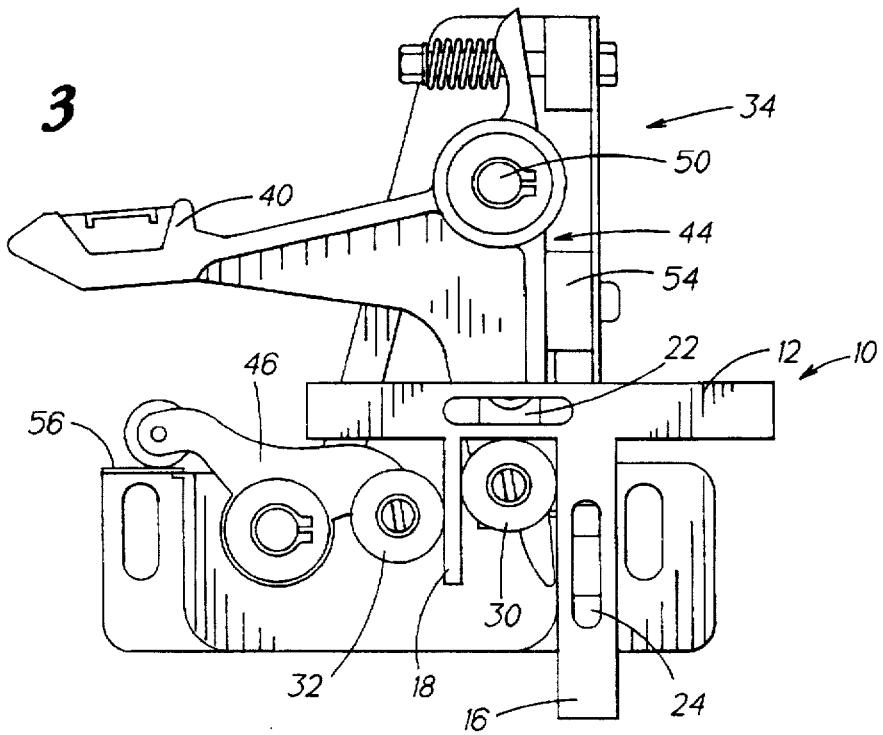
FIG. 3 is a front view of the interlock mechanism in an open position with the interlock gauge of FIG. 1 setting the horizontal distance between the two rollers.

Referring to FIGS. 2 and 3, the latch subassembly 44 pivots about a pivot point 50 and clears a catch 52 of the electric box 42 as the exterior door 38 begins to open to the right. The first roller 30 pivots with the latch subassembly 44 and is stopped by a rubber bumper 54. As the elevator door 38 with the interlock mechanism 34 thereon moves away from the electric box 42 disposed on the hoistway wall 43, the spring loaded belt crank 46 is forced against a flange 56, placing the second roller 32 into its closed position. The second arm 18 of the gauge 10 is placed between the rollers 30, 32 with the first horizontal line level 22 being leveled. The width of the second arm 18 is the exact horizontal measurement between the rollers 30, 32. If the rollers 30, 32 do not fit snugly up against the side of the second arm 18, the position of the bell crank 46 is adjusted to achieve the exact horizontal measurement between the rollers. The flange 56 is bent to adjust the position of the bell crank 46.

The lengths of the first and second arms 16, 18 of the gauge 10 are governed by the vertical distance that the two rollers 30, 32 are offset by. Since the vertical offset between the rollers 30, 32 is greater when the interlock mechanism 34 is in the closed position, the first arm 16 is longer to compensate for the vertical distance between the rollers.

The gauge 10 of the present invention ensures that the interlock mechanism 34 is attached plumb (straight up and down) and that accurate horizontal clearance between the rollers is maintained during closed and open positions of the interlock mechanism. The gauge provides a consistently accurate measurement and reduces the margin of error. Additionally, the gauge of the present invention eliminates the need for multiple tools to measure the horizontal distance between the two vertically offset rollers.

Although the invention has been shown and described with respect to preferred embodiments thereof, it should be understood by those skilled in the art that various changes and omissions in the form and detail thereof may be made therein without departing from the spirit and scope of the invention. For example, the second horizontal line level can be disposed within either the first arm 16 or the second arm 18 of the gauge 10.

We claim:

1. A gauge for adjusting an elevator interlock mechanism, said interlock mechanism having an open position and a closed position, said interlock mechanism including a first roller and a second roller, said first roller and said second roller being horizontally spaced and vertically offset, said gauge comprising:

a gauge body;

a first arm extending from said gauge body, said first arm having a first arm width, said first arm width being equal to a horizontal distance between said first roller and said second roller when said interlock mechanism is in said closed position; and a second arm extending from said gauge body, said second arm having a second arm width, said second arm width being equal to a horizontal distance between said first roller and said second roller when said interlock mechanism is in said open position.

2. The gauge according to claim 1, wherein said second arm being spaced apart from said first arm.

3. The gauge according to claim 1, wherein said gauge body having a horizontal line level mounted therein.

4. The gauge according to claim 1, wherein said first arm having a first horizontal line level mounted thereon.

5. The gauge according to claim 1, wherein said second arm having a first horizontal line level mounted thereon.

6. The gauge according to claim 1, wherein said first arm protruding from said gauge body at a ninety degree (90°) angle.

7. The gauge according to claim 1, wherein said second arm protruding from said gauge body at a ninety degree (90°) angle.

8. A method of installing an interlock mechanism for an elevator system comprising the steps of:

placing said interlock mechanism in a closed position;

inserting a first arm of an interlock gauge between a first roller and a second roller of said interlock mechanism with a first horizontal line level being properly leveled;

adjusting said second roller to ensure the horizontal distance between said first roller and said second roller equal to the width of said first arm of said gauge;

removing said interlock gauge from said interlock mechanism;

placing said interlock mechanism in an open position;

inserting a second arm of said interlock gauge between said first roller and said second roller of said interlock mechanism with said first horizontal line level being properly leveled; and adjusting said second roller to ensure horizontal distance between said first roller and said second roller equal to the width of said second arm of said interlock gauge.

9. The method according to claim 8 further characterized by preceding steps of:

placing an open edge of said interlock gauge against one side of said interlock mechanism;

observing a second horizontal line level disposed within said arm of said interlock gauge to ensure straight positioning of said interlock mechanism; and adjusting said interlock mechanism to ensure straight positioning of said interlock mechanism.

* * * * *